UNITED STATES PATENT OFFICE.

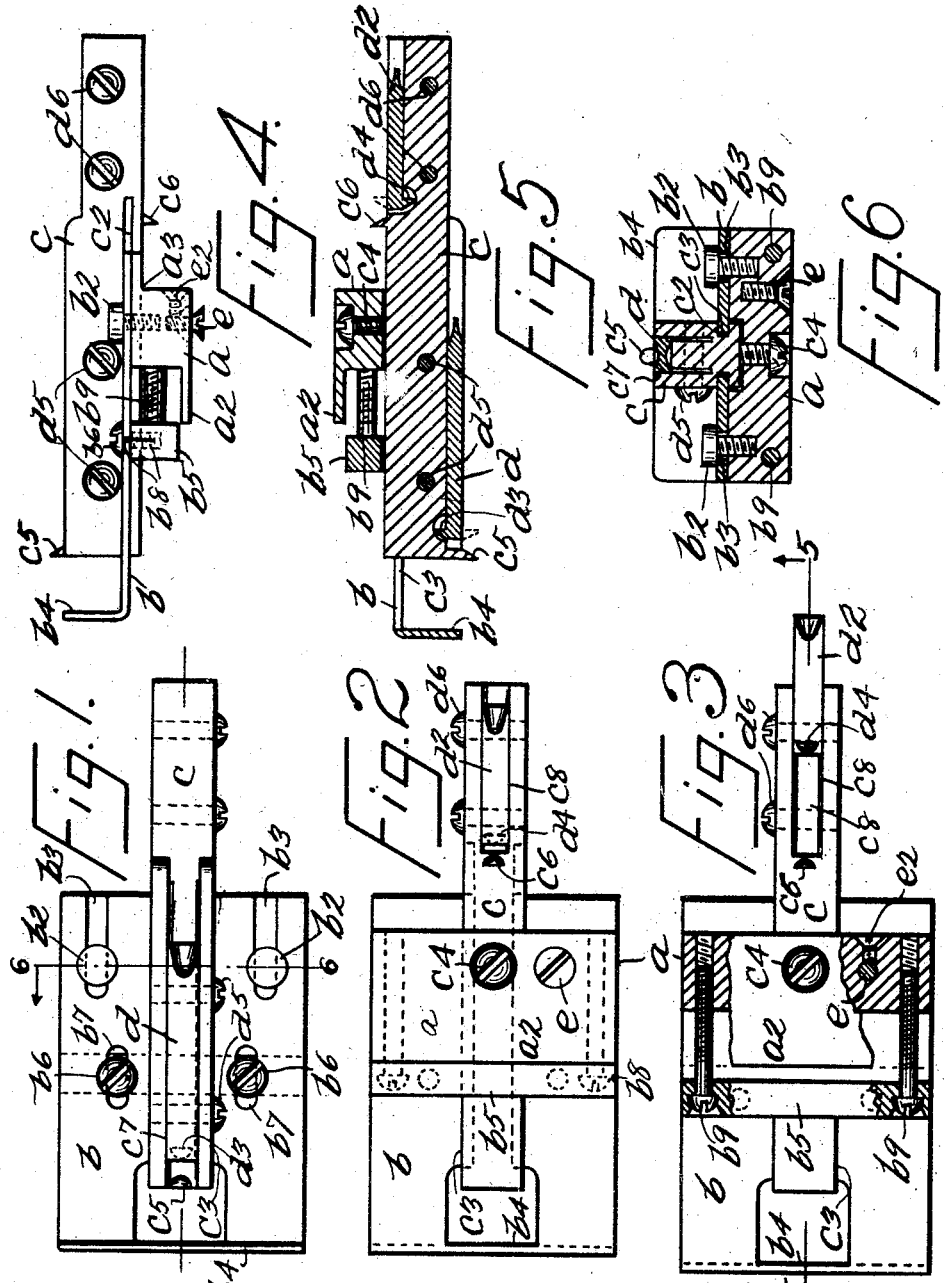

WILLIAM POTTER, OF NEW YORK, N. Y.

MARKING-GAGE.

960,039.

Specification of Letters Patent. Patented May 31, 1910.

Application filed February 15, 1909. Serial No. 477,892.

*To all whom it may concern:*

Be it known that I, WILLIAM POTTER, a citizen of the United States of America, and residing at New York, in the county of New York and State of New York, have invented certain new and useful Improvements in Marking-Gages, of which the following is a specification such as will enable those skilled in the art to which it appertains to make and use the same.

My invention relates to gages for the use of carpenters and others in laying out work, setting of hardware, etc., and the object thereof is to provide such a device whereby gage marks may be made either from the body or from the end of the device; a further object being to provide means whereby the said gage marks will be identical in adjustment in the normal use of the device, regardless of the degree of adjustment of either marking point; a further object being to provide means whereby a predetermined difference of adjustment will result between, in special uses of the device, said marking points, regardless of the degree of adjustment of either, thereby adapting the device to the setting of doors wherein a space is desired therebetween and the stops thereof; a further object being to provide supplemental marking points whereby, when desired, two parallel marks may be made simultaneously, in either of two positions of the device with a predetermined degree of adjustment in either position, thereby adapting the device to mortising, setting of lock-plates, flush-plates, and the like; a further object being to provide guides for the said points whereby, in the use of the device, the tipping common to gages now in use is prevented; a further object being to provide means for adjusting the primary points, with relation to their guides, to compensate for wear, accident, or inaccurate sharpening thereof; a further object being to provide visual means for showing the difference of adjustment of the two primary points, when such use is desired; a further object being to provide an independently operable and adjustable depth gage for use in mortising and in the setting of builders' hardware, and a still further object being to provide such a device which is small, compact, simple in construction and use, well adapted for the purposes for which it is intended and which is comparatively inexpensive.

My invention is fully described in the following specification, of which the accompanying drawings form a part, in which the separate parts are designated by the same reference characters in each of the views, and in which—

Figure 1 is a plan view of one side of my invention; Fig. 2 is a plan view of the other side thereof; Fig. 3 is a view similar to Fig. 2, but with the parts in different positions, and partly broken away; Fig. 4 is a side view of my invention, with the parts in the position of Fig. 1; Fig. 5 is a section taken on the line 5—5 of Fig. 3; and Fig. 6 is a section taken on the line 6—6 of Fig. 1.

In the drawings forming a part of this application I have shown a base $a$ provided with an extension $a^2$ and having a rabbet $a^3$ Fig. 4 on one edge thereof, a plate $b$ being adapted to slide on said base, being held thereon by means of heads $b^2$ Figs. 1 and 6 operating in slots $b^3$ and secured in the base $a$, said plate being provided with an upturned guide $b^4$ at the outer end thereof and having a block $b^5$ adjustably secured thereto, by means of screws $b^6$ Fig. 1 in slots $b^7$, and adapted to move in line with the extension $a^2$, as clearly shown in Fig. 4, said block and plate being provided with registering notches $b^8$ Fig. 4 serving as an index to the normal position of the said block, and, passing through the said block and into the base $a$ are two screws $b^9$ Fig. 3 whereby said block and thereby the plate $b$ may be adjusted with relation to the base $a$.

Slidably mounted in the plate $b$ is a bar $c$, grooved at its sides to engage, as shown at $c^2$, Fig. 6 the sides of a slot $c^3$ in the said plate, said bar being adapted to be locked to the base $a$ by means of a screw $c^4$, said bar being also provided with primary marking points $c$ and $c^8$ Fig. 5 and being also provided with channels $c^7$ and $c^8$ in which carriers $d$ and $d^2$ having points $d^3$ and $d^4$ thereon, respectively, are adapted to be held by means of screws $d^5$ and $d^6$ Figs. 5 and 6, respectively.

Upon the outer surface of the base $a$ I provide a screw $e$, held in any desired adjustment by means of a lock screw $e^2$ Fig. 4, and which is adapted for use as a depth gage to determine the depth of a mortise, rabbet, or other cuts intended for the reception of lock plates, flush plates, striking plates, or other hardware, including hinges and the like.

In practice, the block $b^5$ is arranged in absolute register with the edge of the extension $a^2$ at which time the point $c^5$ is the same distance from the guide $b^4$ as is the point $c^6$ from the rabbet $a^3$, regardless of the degree of movement of the bar $c$ over the base $a$ or within the plate $b$, thus adapting my device for making a mark in a predetermined position with either point and the corresponding guide $b^4$ or $a^3$ which also serves as a guide, said guides preventing tipping of the device in the operation of marking because of long bearing resulting from the width of the said plate and of the base, and I may use either the body or the end of my device for the marking guide according to the character of the work being operated upon.

If it is desired to mortise, either or both of the carriers $d$ and $d^2$ may be reversed in their channels, thus bringing the supplemental points $d^3$ and $d^4$ into operative position and permitting a double mark in either position of the device, said carriers being locked in the desired positions by means of the screws $d^5$ and $d^6$ and thus enabling two markings of parallel lines of different distances therebetween or of the same distance, as desired, according to necessity and if the width of the said double mark be greater than the adjustability of the carriers, said carriers may be reversed end for end and thus increase the width between the fixed points and the points carried by said carriers. If, however, it is desired to have the mark produced by the point $c^5$ more distant from its guide than is the point $c^6$ from its guide, the screws $b^9$ are turned and the block $b^5$ moves the plate and guide $b^4$ away from the primary point $c^5$ without changing the relationship of the point $c^6$ with its guide, this operation being necessary in the setting of doors whereby a space results between the door and the door stops and producing a corresponding difference in the setting of the lock striking plate, the degree of said door clearance being visible on the device by the difference between the block $b^5$ and the extension $a^2$, as clearly illustrated in Figs. 4 and 5, not only the primary points being operable in this way but also the supplemental points when double marking is desired, and, by means of this difference in adjustability of the primary points, a uniform setting of the door hinges results by using the point $c^5$ and a uniform setting of the lock plates in the doors by using the point $c^6$, the former being also employed in setting the lock striking plates, for a great number of doors.

In the original assembling of my device, the notches $b^8$ Fig. 4 register with each other but if, through long use, accident, improper point sharpening, or for any cause, my device should get out of true, the block $b^5$ may be adjusted on the plate $b$ to overcome such defect without preventing any of the usual functions of my invention after such re-adjustment.

It will therefore be seen that I provide a device by means of which a gage mark may be made from either of two guide points if the other be rendered inoperative because of the character of the work being operated upon, said marks being identical if desired, or different, according to the exigencies, and I may move the bar $c$ into any position without altering the relationship of the marking points with the corresponding guides, but this relationship may be altered at any time by moving one of said points away from its guide, or toward it, without changing the relationship of the other guide and its point and the degree of change in such point relationship is clearly read upon the device and either a single or a double mark may be made from either of said guides, of any degree of single or double adjustment.

It will be observed that the primary marking points always bear an exact relationship with each other, whereas the guides $b^4$ and $a^3$ are movable toward or from each other and thus changing their relationship but the relationship of the points with the guides is positive, regardless of the movement of the bar carrying the points.

Having fully described my invention, what I claim as new and desire to secure by Letters Patent, is—

1. A device of the class described, comprising a base having a guide thereon, a plate slidable on said base and having an end guide thereon, a bar slidable on said base and having two marking points thereon, the distance between the points and corresponding guides being identical in any position of said bar while the plate and base remain fixed in respect to each other.

2. A device of the class described, comprising a base having a guide thereon, a plate slidable on said base and having an end guide thereon, a bar slidable on said base and having two marking points thereon, the distance between the points and corresponding guides being normally identical in any position of said bar, and means for adjusting said end guide with relation to its marking point while the plate and base remain fixed in respect to each other.

3. A device of the class described, comprising a base, having a rabbet guide thereon, a plate slidable on said base and having an end guide thereon, a bar slidable on said base and having two marking points thereon, the distance between the points and corresponding guides being identical in any position of said bar while the plate and base remain fixed in respect to each other.

4. A device of the class described, comprising a base having a rabbet guide on said base, an adjustable plate thereon having an end guide, a bar provided with a marking point for each of said guides adjustable in said base and supplemental marking points adapted to be brought into operative position and operate in conjunction with said first named points.

5. A device of the class described, comprising a base having a guide thereon, a plate slidable on said base and having an end guide thereon, said base having an extension and said slide having a block in normal juxtaposition, means for adjustably moving said plate in said base, the degree of said movement being indicated by said extension and slide positions, and a bar slidable on said base and having two marking points thereon, one for each of said guides.

In testimony that I claim the foregoing as my invention I have signed my name in presence of the subscribing witnesses this 11th day of February 1909.

WILLIAM POTTER.

Witnesses:
HARRY A. ANDERSON,
J. C. LARSEN.